May 3, 1966  M. B. GOLDSTEIN ETAL  3,248,788
APPLICATION OF FLAME-SPRAYED LININGS
ON THE INSIDE DIAMETER OF TUBES
Filed Nov. 21, 1962

INVENTORS
MARCY B. GOLDSTEIN
ROBERT A. McKINNEY
BY
ATTORNEYS

United States Patent Office 3,248,788
Patented May 3, 1966

3,248,788
APPLICATION OF FLAME-SPRAYED LININGS ON THE INSIDE DIAMETER OF TUBES
Marcy B. Goldstein, San Carlos, Calif., and Robert A. McKinney, Edgewood, Md., assignors to Martin Marietta Corporation, New York, N.Y., a corporation of Maryland
Filed Nov. 21, 1962, Ser. No. 239,280
12 Claims. (Cl. 29—423)

This invention relates to flame-sprayed coatings and more particularly to a method for applying a flame-sprayed lining to the inner wall of an elongated tubular member characterized by a relatively small diameter and considerable length.

In the manufacture of tubular members, especially those having considerable length and a relatively small diameter, it is often necessary to line the inner wall surface with a thin coating. Conventional coating techniques are satisfactory for producing certain types of linings on the interior of tubular members, but in most cases, the internal coatings are not satisfactory because the wall thickness of the coatings are generally variable throughout the length of the tubular member. Certain linings or coatings of tubular members require subsequent heat treatment after application to densify the coating. Necessarily, subjecting the composite article to a heat treating process results in unequal expansion and contraction of the tubular member and the lining therein, and in some cases, shrinkage of the lining results from the heat treatment, which may lead to cracks in the coating and loss of dimensional accuracy.

One particular type of coating which has been used in the past for a variety of applications is a flame-sprayed coating. Ceramic flame-sprayed coatings have been extensively used in the protection of metals, the production of an electrical insulation coating, the production of abrasion-resistant surfaces, and in many other valuable and useful applications. Due to the nature of the prior art equipment and the processes used, flame-sprayed coatings can only be applied to those surfaces of the substrate material which are, for the most part, perpendicular to the line of sight of the flame-sprayed gun. Immediately, it becomes apparent that while flame-sprayed coatings would be quite useful when applied to the internal surfaces of a tubular member, present techniques are completely unsuitable. It is impossible to use conventional techniques for flame-spraying the internal walls of tubular members which are either extremely small in diameter or of considerable length.

It is, therefore, a primary object of this invention to provide a method for flame-spray coating or lining a tubular member of considerable length and relatively small diameter.

It is a further object of this invention to provide a method of flame-spray coating a tubular member of this type in which the coating or lining may be extremely thin and within close dimensional tolerances.

It is a further object of this invention to provide a method for flame-spray coating the inner surface of a tubular member of this type in which the coating or lining has uniform wall thickness.

It is a further object of this invention to provide a method for flame-spray coating the inner surface of a tubular member of this type which eliminates the need for subsequent heat treating to densify the lining after its placement within the tubular member.

Other objects of this invention will be pointed out in the following detailed description and claims and illustrated in the accompanying drawing which discloses, by way of example, the principle of this invention and the best mode which has been contemplated of applying that principle.

In general, the process of the present invention consists of a method whereby flame-sprayed linings may be applied along the inner wall of small diameter tubular members of considerable length by a transfer process. The method includes the steps of flame-spraying a coating of desired material on a mandrel of predetermined diameter, machining the coated surface of the mandrel to a diameter in the order of the internal diameter of the tubular member, fitting the machined, coated mandrel within the tubular member, and decomposing the mandrel whereby the coating or lining remains affixed to the inner surface of the tubular member. In the preferred form, the mandrel is press-fitted within the tubular member. In the process in which the mandrel is formed of metal, the mandrel is subsequently decomposed by leaching with a suitable acid while in processes in which the mandrel is formed of graphite or like material, it is decomposed by heating to a high temperature where sublimation occurs.

The present invention has application to any material which may be flame-sprayed or plasma-sprayed and may serve as a lining for a tubular member. Materials applicable as linings include metals, oxides, carbides, nitrides, etc. At the same time, the tubular member which acts as a container for the lining may be formed of any conventional material, such as metal, ceramic, or plastic, for example. The selection of the mandrel material and the method of its removal is determined primarily by a consideration of the chemical properties of all the constituents. While the example shown in the accompanying drawing makes use of a metal mandrel formed of brass and is used in effecting the transfer of a flame-sprayed coating of aluminum oxide to a columbium tubular member, the present invention has application to a great number of combinations. For example, a graphite mandrel may be used to carry a suitable coating or lining for transfer to a ceramic or plastic tubular member in which decomposition of the graphite mandrel occurs as a result of sublimation by prolonged heating in air at low temperatures.

Figure 1:
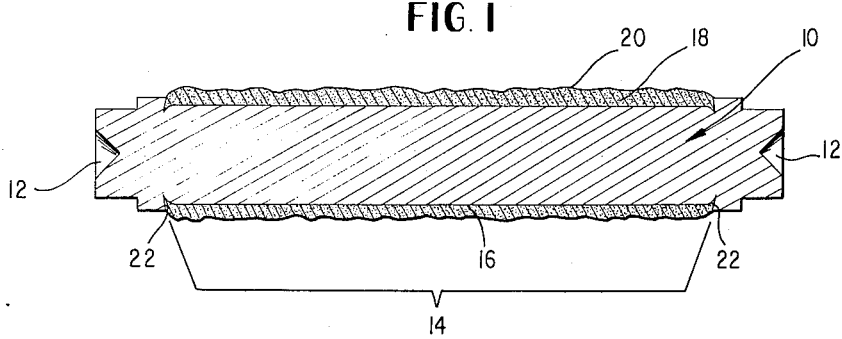
FIGURE 1 is a sectional elevational view of a mandrel carrying the flame-sprayed coating for the transfer process of the present invention.
Figure 2:
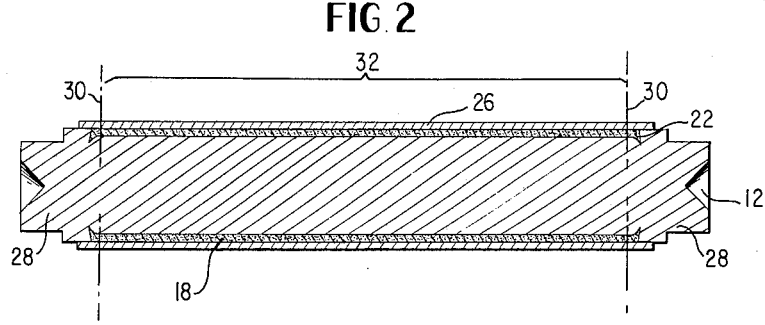
FIGURE 2 is a sectional elevational view of the mandrel ber of FIGURE 1 carrying the flame-sprayed coating after placement within the tubular member under the method of the present invention.
Figure 3:
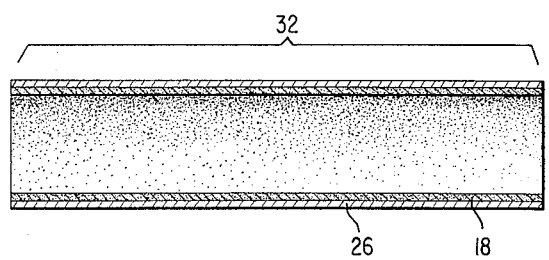
FIGURE 3 is a sectional elevational view of the tubular member carrying the flame-sprayed lining after the mandrel has been removed by the process of the present invention.

For a better understanding of the present invention, reference will now be had to the accompanying drawing in which FIGURES 1, 2, and 3 depict, in sequence, the various stages of the process. In FIGURE 1, a cylindrical solid brass mandrel 10 is machined to provide the particular configuration shown. For instance, the ends of the brass mandrel are provided with reference centers 12 so that the mandrel can be readily re-positioned within suitable machine tools during each stage of the process. After the mandrel is machined to provide the appropriate diameter of the central section 14, the mandrel is removed from the lathe and sand blasted to promote adherence of the coating material during the subsequent flame-spraying step. In the examples shown, the coating 18, which is affixed to the outer surface 16 of the mandrel, is aluminum oxide. It is important that the diameter of the central section 14 after sand blasting is equal to the exact internal diameter of the flame-sprayed coating desired for the final product after insertion and transfer to the tubular member.

It is not necessary that the flame-sprayed aluminum oxide coating 18 be uniform in thickness over the full length of the central section 14 as indicated by the uneven outer surface 20 of the coating in FIGURE 1. It is, however, important that the thickness of the coating 18 on the mandrel at any point be greater than the desired thickness of the coating of the finished product after its transfer to the tubular member.

In order to insure adherence of the lining 18 to the mandrel 10, the edges of the sand blasted area of central portion 14 of the mandrel are undercut prior to spraying as to at 22 to "lock in" the flame-sprayed layer 18. Subsequent to the buildup of the flame-sprayed layer 18 on the mandrel, the mandrel is positioned by means of the locating or reference centers 12 in an appropriate machine for machining the outer surface of the flame-sprayed coating 18 to a desired diameter which is in order of the internal diameter of the tubular member to which the coating 18 is to be applied. Various machining operations may be employed to effect the desired outer diameter of the mandrel assembly including the flame-sprayed coating 18. For instance, the mandrel 10 may be repositioned upon a lathe and turned down to the desired diameter or abrasive techniques may be employed for removing a portion of the coating 18 to provide a uniformly constant diameter of the mandrel assembly.

Referring to FIGURE 2, the mandrel assembly, including mandrel 10 and the machined portion of the coating 18, is shown positioned with the tubular member 26 which will receive the flame-sprayed coating. In the present example, a "force fit" or press fit operational step is employed for uniting the mandrel 10, its flame-sprayed coating 18, and the tubular member 26. In this instance, the machining operation was carried on until the outer diameter of the assembly, including the mandrel 10 and the flame-sprayed coating 18, were slightly in excess to the inner diameter of the tubular member 26. This allowed the press fit of the coated mandrel assembly within tubular member 26. In the process of the present example, a tubular member 26 consists of columbium. After press fitting, the extreme ends 28 of the free element assembly are sliced along the vertical planes 30 by appropriate cutting tools and the ends 28 are discarded. It is to be noted that the slicing planes 30 are on the inside of the undercut portions 22 of the mandrel thereby providing a final mandrel, coating or lining, and tubular member assembly 32 in which all elements are of uniform thickness.

The next step in the process of the present invention is the placement of the flame-sprayed mandrel with its fitted tubular member in a bath of concentrated nitric acid which effectively dissolves the mandrel portion 10 formed of brass in the present assembly leaving the tubular member 26 formed of columbium with the aluminum oxide lining affixed thereto. Both the columbium and the aluminum oxide are chemically resistant to nitric acid so that the nitric acid merely dissolves the brass mandrel. FIGURE 3 shows the final assembly of the container or tubular member 26 and the coating or lining 18 after acid treatment.

In the above example, the method of the present invention is described as being applicable to a specific assembly of elements including a brass mandrel, an aluminum oxide coating or lining, and a columbium tubular member or container. At the same time, the brass mandrel is decomposed by leaching or dissolving the mandrel by concentrated nitric acid baths. It is important to point out that the method of the present invention is applicable to the transfer of flame-sprayed coatings of many different materials to tubular members also formed of varying materials, and to the use of various types of mandrels which have their own individual means for decomposition to effect the transfer step. The present invention has application to many combinations involving the process steps outlined above and it is not intended that the scope of the present inventions be limited to the exact materials of the examples shown in FIGURES 1 through 3 inclusive, or the alternate materials specifically stated within the specification.

It is also important to point out that the present invention is especially useful with respect to ceramic flame-sprayed coatings but may have application to all high temperature coating techniques of this type including plasma spray.

In the utilization of the technique of the present invention, it is possible to fabricate linings as thin as .010 inch with extremely close dimensional tolerances. Another advantage of the process of the present invention is that the lining produced is approximately 90% dense and eliminates the need for subsequent heat treatment which is normally required for densification of linings applied by other techniques. In the field of ceramic flame-sprayed coatings, by the proper selection of the mandrel, lining, and container or tubular member, several combinations could be used to produce finished products of this type. In the particular combination of the examples shown in FIGURES 1 through 3 with regard to the tubular member and lining, namely, columbium and aluminum oxide, an excellent expansion match exists. Aluminum oxide has a slightly higher coefficient of expansion at higher temperatures, and hence, at the higher temperatures, a tighter fit between the tubular member and the lining exists. As mentioned previously, the physical and chemical properties of the elements are taken into consideration to provide a finished product having a dense coating or lining and constant wall thickness with the lining being free of cracks due to uneven or unequal expansion characteristics of the materials.

While the process of the present application is advantageously applied to elements having circular cross-sectional configurations, the tubular member and the mandrel may have cross-sectional configurations which are irregular, rectangular rather than circular, for instance. The only necessity being that the configurations of the elements are similar to effect a proper transfer of the formed coating from the mandrel to the container or tubular member.

While there have been shown and described and pointed out the fundamental novel features of the invention as applied to a preferred method and for a particular configurational embodiment, it will be understood that various omissions and substitutions and changes in the form and detail of the method so described may be made by those skilled in the art without departing from the spirit of the invention. It is the intention, therefore, to be limited only as indicated by the scope of the following claims.

What is claimed is:

1. A method of providing a non-metallic flame-sprayed lining within a tubular member of considerable length and of relatively small diameter and of a material of a lower coefficient of expansion than the flame sprayed lining comprising: flame-spraying a coating of desired non-metallic material on a mandrel of like configuration to said tubular member, machining said coated mandrel to a diameter slightly in excess of the inner diameter of said tubular member, press fitting said machined, coated, mandrel within said tubular member, and decomposing said mandrel whereby said flame-sprayed non-metallic coating remains affixed to the inner surface of said tubular member.

2. A method as defined in claim 1 in which the mandrel is formed of metal and is decomposed by leaching with a suitable acid.

3. A method as defined in claim 1 in which the mandrel is formed of graphite and is decomposed by heating to a temperature sufficient to sublimate said graphite mandrel.

4. A method of providing a non-metallic flame-sprayed lining within an elongated tubular member of considerable length and of relatively small diameter having a lower coefficient of expansion than the flame sprayed lining comprising: flame-spraying a coating of desired non-metallic material on a mandrel of approximately the same configuration size as the inner surface of said tubular member, machining said coated mandrel to a diameter in the order of the inner diameter of said tubular member, fitting said machined, coated mandrel within said tubular member, and decomposing said mandrel whereby said flame-sprayed non-metallic coating remains affixed to the inner surface of said tubular member.

5. A method as defined in claim 4 wherein said mandrel is formed of metal and is decomposed by leaching with a suitable acid.

6. A method as defined in claim 4 wherein said mandrel is formed of graphite and is decomposed by heating to a temperature sufficient to vaporize said graphite.

7. A method of providing a flame-sprayed lining within a tubular member of columbium having considerable length and of relatively small diameter comprising: flame-spraying a coating of aluminum oxide on a brass mandrel having a diameter equal to the desired inner diameter of the resulting lined columbium tubular member, machining said coated mandrel to a diameter in the order of the inner diameter of said columbium tubular member, fitting said machined, coated, brass mandrel within said columbium tubular member, and leaching said brass mandrel by subjecting said assembly to concentrated nitric acid whereby said aluminum oxide coating remains affixed to the inner surface of the said columbium tubular member.

8. A method of providing a flame-sprayed coating of aluminum oxide within a tubular member formed of columbium having considerable length and of relatively small diameter comprising: flame-spraying a coating of aluminum oxide on a brass mandrel having a diameter equal to the desired inner diameter of the lined columbium tubular member, machining said coated mandrel to a diameter slightly in excess of the inner diameter of said columbium tubular member, press fitting said machined, coated mandrel within said columbium tubular member, and decomposing said mandrel by subjecting said mandrel to concentrated nitric acid whereby said aluminum oxide coating remains affixed to the inner surface of said columbium tubular member.

9. A method of providing a non-metallic flame-sprayed coating within an elongated tubular member of considerable length and relatively small diameter comprising: machining a mandrel of like configuration to said tubular member to a diameter equal to the desired inner diameter of the coated tubular member, sand blasting said machined surface of said mandrel to effect adherence of said flame-sprayed non-metallic coating, flame-spraying said non-metallic coating onto said sand blasted mandrel surface, machining said flame-sprayed surface of said mandrel to a diameter slightly in excess of the internal diameter of said tubular member, press fitting said machined, coated mandrel within said tubular member, and removing said mandrel whereby said non-metallic coating remains affixed to the inner surface of said tubular member.

10. A method as defined in claim 9 wherein said mandrel is formed from brass, said coating is aluminum oxide, said tubular member is formed of columbium metal and said mandrel is removed by leaching with a suitable acid.

11. A method as defined in claim 10 wherein the edges of said sand blasted area on said mandrel are undercut to lock in the flame-sprayed coating prior to the subsequent application of the flame-sprayed coating.

12. A method of providing a non-metallic flame-sprayed lining within a tubular member of a specified length comprising the steps of:
 (a) forming a mandrel of like outside configuration as the inner configuration of said tubular member, said mandrel being longer than said specified length of said tubular member and being undercut at a position on at least one extended portion thereof;
 (b) flame-spraying a non-metallic coating of said lining material on said mandrel;
 (c) machining said coating on said mandrel to a diameter approximating the inner diameter of said tubular member;
 (d) press fitting said machined, coated, mandrel within said tubular member;
 (e) removing said extending portions of said coated mandrel; and
 (f) decomposing said mandrel whereby said flame-sprayed non-metallic coating remains affixed to the inner surface of said tubular member.

References Cited by the Examiner

UNITED STATES PATENTS

| | | | |
|---|---|---|---|
| 2,636,849 | 4/1953 | Brenner | 29—529 XR |
| 3,101,531 | 8/1963 | Roseberry | 29—502 XR |
| 3,156,033 | 10/1964 | Brown | 29—528 XR |

WHITMORE A. WILTZ, *Primary Examiner.*

P. M. COHEN, *Assistant Examiner.*